F. S. ALLEN & H. C. LANE.
Plier.
No. 208,878.  Patented Oct. 8, 1878.
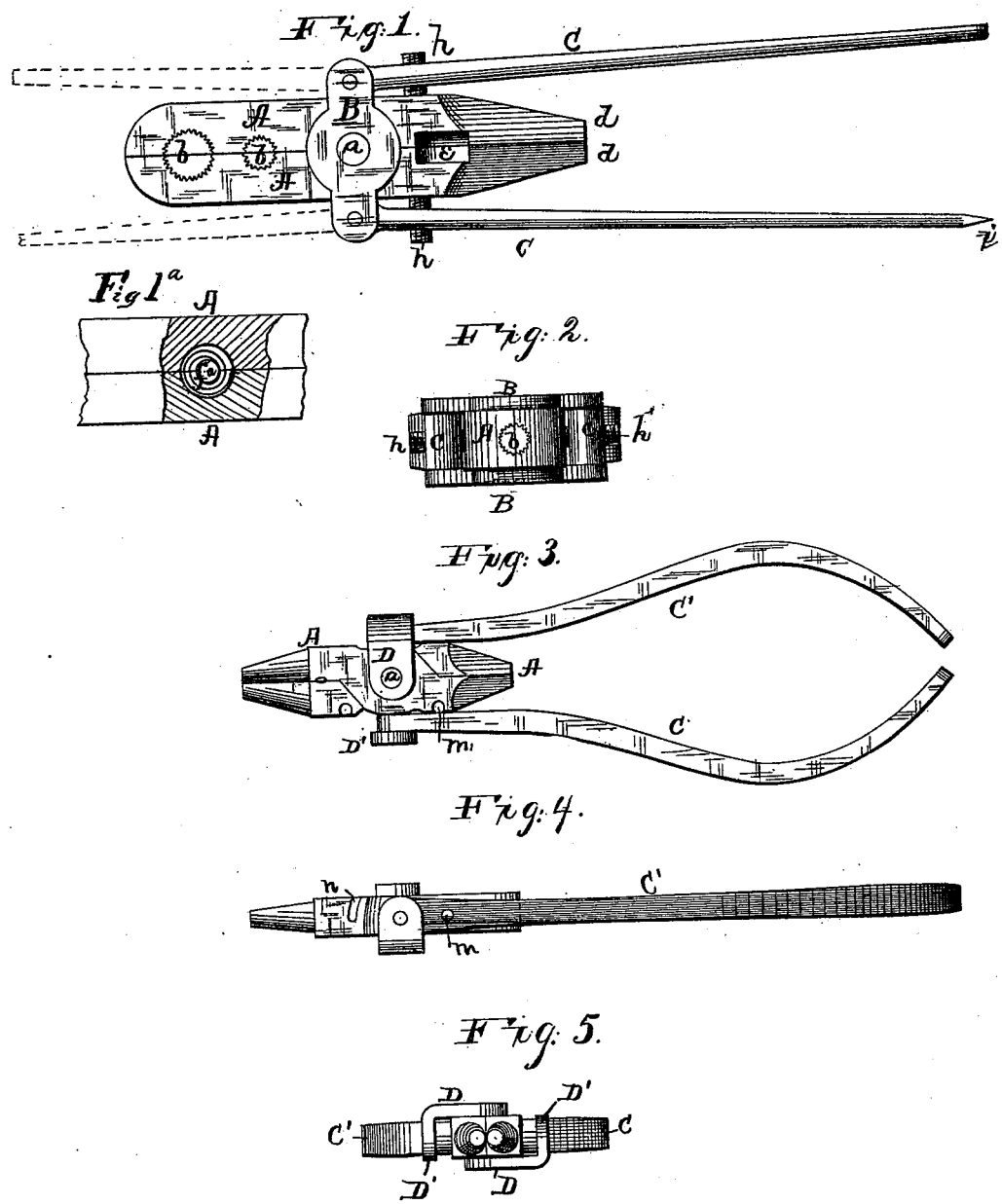

UNITED STATES PATENT OFFICE.

FREEMAN S. ALLEN AND HENRY C. LANE, OF WASHINGTON, DISTRICT OF COLUMBIA; SAID ALLEN ASSIGNOR OF HIS RIGHT TO SAID LANE.

IMPROVEMENT IN PLIERS.

Specification forming part of Letters Patent No. 208,878, dated October 8, 1878; application filed September 27, 1878.

*To all whom it may concern:*

Be it known that we, FREEMAN S. ALLEN and HENRY C. LANE, of the city of Washington, in the District of Columbia, have invented certain new and useful Improvements in Pliers; and we do hereby declare the following to be a full, clear, and exact description thereof, reference being had to the accompanying drawing, and to the letters of reference marked thereon.

The nature of our invention consists in a pair of pliers provided with double jaws; also, in combining with such double jaws reversible handles, and in the construction and combination of parts, as will be hereinafter more fully set forth.

In order to enable others skilled in the art to which our invention appertains to make and use the same, we will now proceed to describe its construction and operation, referring to the annexed drawing, in which—

Figure 1 is a plan view of a pair of pliers embodying our invention, and Fig. 1ª shows a section through the pivot of the double jaws. Fig. 2 is an end view of the same. Fig. 3 is plan view; Fig. 4, a side view, and Fig. 5 an end view, showing a modification of our invention.

A A represent two double jaws, pivoted together at or near the center by a rivet, *a*. The ends of the double jaws may be shaped in any desired manner. For instance, one end may be formed as a pipe-wrench, as shown at *b b*, and the other end as ordinary pliers *d*, with wire cutters *e*; but we do not confine ourselves to any particular formation of said jaws as long as they are made double, and either end can be used, as required.

Around the central or pivoting rivet, *a*, the inner faces of the double jaws are recessed to receive a spring, *f*, so arranged as to expand diametrically and open the jaws. On each end of the rivet *a* is fastened a plate, B, which extends on both sides of the double jaws. Between these plates, on each side, is pivoted a handle, C, as shown, and at a suitable point each handle is on each side provided with a projection, *h*. These projections may be formed with the handles in any convenient manner, or they may be formed by passing a pin or screw through each handle to project on both sides thereof.

The handles C C, being pivoted between the ends of the plates B B, as described, are reversible, so as to bring either ends of the double jaws outward, the projections *h* on the handles bearing against the outer sides of the (for the time being) inner ends of the double jaws, so that by pressing the handles together the outer ends of the jaws are closed for use. It is, however, evident that the handles need not necessarily be made reversible. They may be connected to the outside of the double jaws in such a manner that, while the outer ends of the jaws can be used outside of the handles, the inner ends can be used between the handles, if desired.

The handles C C are shown as straight, and the end of one of said handles shaped to form a screw-driver, as shown at *i*.

In Figs. 3, 4, and 5 we have shown the handles curved, and when these curved handles are to be reversible they are pivoted in the following manner: On each end of the rivet *a*, which pivots the double jaws A A, is fastened a metal bar, D, said bars extending in opposite directions, and formed each with a lip, D′, turned at right angles to it a short distance from the side of the jaw, as shown fully in Fig. 5.

C′ C′ are the curved handles, the forward ends of which are pivoted to the inner sides of the lips D′. Each handle C′ is at a suitable point provided with a headed pin, *m*, which passes into a groove, *n*, made in the outer side of the double jaw, each double jaw being provided with two such grooves from opposite sides. With this construction the spring *f* may be dispensed with, because the headed pins take hold of the inner ends of the double jaws, and the jaws can thus be opened by the handles.

Having thus fully described our invention, what we claim as new, and desire to secure by Letters Patent, is—

1. A pair of pliers consisting of two double jaws, with handles connected thereto, substantially as herein set forth.

2. In a pair of pliers, the combination of two pivoted double jaws and two reversible handles, for the purposes set forth.

3. The combination of the double jaws A A, pivoted together at $a$, the plates B B, and the reversible handles C C, provided with the projections $h\ h$, substantially as and for the purposes herein set forth.

In testimony that we claim the foregoing improvements, as above described, we have hereunto set our hands and seals this 10th day of April, 1878.

F. S. ALLEN. [L. S.]
   HENRY C. LANE. [L. S.]

Witnesses:
 EDWD. H. PHILLIPS,
 CHAS. P. CARTY.